United States Patent Office 2,943,976
Patented July 5, 1960

2,943,976

METHOD OF KILLING INSECTS COMPRISING APPLYING NITROPYRIDINE AND NITROPYRIDINE-1-OXIDE

Lyle D. Goodhue, Bartlesville, Kenneth E. Cantrel, Dewey, and Anton M. Schnitzer, Bartlesville, Okla., assignors to Phillips Petroleum Company, a corporation of Delaware No Drawing. Filed Oct. 8, 1957, Ser. No. 688,838

9 Claims. (Cl. 167—33)

This invention relates to killing insects such as flies, roaches, ants, gnats, mosquitoes, and the like. In one of its aspects, the invention relates to killing such an insect by contacting the same with a nitropyridine, an alkyl nitropyridine, a nitropyridine-1-oxide, and an alkyl nitropyridine-1-oxide, the alkyls being methyl and/or ethyl and the total carbons in the alkyls being not in excess of three. In another of its aspects, the invention relates to novel insecticidal preparations containing as an essential active ingredient at least one of the foregoing compounds.

The problem of finding insecticides which are truly effective and to which the insects are not resistant is a very real one. Considerable research and expense are currently involved to discover and to set forth novel and effective insecticides. Predictability in the insecticide field is difficult in almost any case and, indeed attempts to predict meet with little or no success. Thus, until a truly representative member or members of a specific class of compounds has been tested, one skilled in the art cannot say whether there will be insecticidal activity and if so, whether an acceptable insecticide has been found.

We have now found that certain specific compounds, as described herein, are exceptionally active insecticides.

Therefore, an object of the invention is to provide a novel method of killing insects. Another object of the invention is to provide a novel insecticidal ingredient.

Other aspects and objects of the invention are apparent from a study of this disclosure and the appended claims.

According to the present invention there are provided a method and composition for killing insects which comprises applying to said insects a compound selected from a nitropyridine, a nitropyridine-1-oxide and their alkyl derivatives in which the alkyls are methyl and/or ethyl and in which the total carbon atoms in the alkyls do not exceed three. One or two nitro groups can be present. Compounds included are, among others, 4-nitropyridine-1-oxide
2-nitropyridine-1-oxide
2,4-dinitropyridine-1-oxide
4-nitro-2-methylpyridine-1-oxide
4-nitro-2,6-dimethylpyridine-1-oxide
3-nitro-2,6-dimethylpyridine-1-oxide
4-nitro-2-ethylpyridine-1-oxide
4-nitropyridine
2-nitropyridine
2,4-dinitropyridine
4-nitro-2-methylpyridine
3-nitro-2,6-dimethylpyridine
4-nitro-2,6-dimethylpyridine
4-nitro-2-ethylpyridine
4-nitro-2-methyl-5-ethylpyridine
4-nitro-2-methyl-5-ethylpyridine-1-oxide
2,4-dinitro-3,5-dimethylpyridine-1-oxide
2,4-dinitro-3-methyl-5-ethylpyridine-1-oxide
6-nitro-2-methyl-5-ethylpyridine-1-oxide
4-nitro-2,3,6-trimethylpyridine-1-oxide
4-nitro-2,3,5-trimethylpyridine-1-oxide
2,4-dinitro-3,5-dimethylpyridine
2,4-dinitro-3-methyl-5-ethylpyridine
6-nitro-2-methyl-5-ethylpyridine
4-nitro-2,3,6-trimethylpyridine
4-nitro-2,3,5-trimethylpyridine The insecticides of this invention can be prepared by any suitable method. Pyridine-1-oxide, for example, can be obtained by the treatment of a glacial acetic acid solution of pyridine with hydrogen peroxide. The product, when subjected to the action of a mixture of nitric and sulfuric acids, yields 4-nitropyridine-1-oxide. 2-nitropyridine is also obtained in this reaction.

The insecticides of the present invention can be used in any of the forms in which insecticides are commonly employed such as solutions, emulsions, dusts, wettable powders, aerosols, and the like. Well known dispersing agents can be used when preparing emulsions with water or other immiscible liquids and the resulting compositions employed as sprays. One convenient method for the preparation of aqueous suspensions is to dissolve the insecticide in a solvent immiscible with water, such as xylene, add a surface active agent, and finally water. When the insecticides are solid compounds, they can be pulverized and used alone as dusts or admixed with inert carriers such as talc, powdered rock, lime, etc. Dusts can also be made by spraying the inert dust carriers with solutions of the insecticides in volatile solvents. When applying the insecticides in the form of aerosols, they can be dissolved in such solvents as acetone, cyclohexanone, and the like. These solutions are then employed in an aerosol bomb in conjunction with a propellant such as a halogenated hydrocarbon and other similar non-hazardous, compressible, normally gaseous materials.

When applying the insecticides of this invention in a solvent or carrier, the lower effective limit of the insecticide ingredient concentration is about 0.1 weight percent. Similarly, when applying the insecticides as dusts, the concentration of the active ingredient is preferably within the limits of 1 to 20 weight percent. Generally, it is advantageous to make application of the insecticide in a manner so as to deposit from about 1 to 10 grams of the active ingredient on each 100 square feet of surface. However, larger or smaller amounts can be applied, as desired, although it is generally neither economical to employ larger amounts or efficient, because of short insecticidal action, to employ smaller amounts. One excellent method for applying these insecticides is in the form of wettable powders. A typical wettable powder formulation comprises 25 weight percent of one of the insecticides of this invention, 5 weight percent of an emulsifier such as an alkylated aryl polyether alcohol (Triton X100) and 70 weight percent of a finely-divided attapulgite.

*Example I*

An apparatus for testing roach repellants was made from 4" x 4" glass cylinders with U-shaped openings near the bottom to allow free passage of the roaches. The inside of the glass was sand blasted and ground further with medium emery cloth. A ¾ inch strip of petroleum jelly was applied at the top of each cylinder. Two cylinders with openings coinciding were taped together and placed on a piece of window glass to form a bottom. Filter papers were slipped unde each cylinder and roaches were introduced the evening before the test was to start. Such a procedure gave them a chance to become accustomed to new quarters. By morning they had quit trying to escape and had learned the passage-ways from one cylinder to another.

The day previous to the test, a piece of 11 cm. Whatman No. 40 filter paper was dipped into a 5 weight percent solution of 4-nitropyridine-1-oxide in acetone, drained, and dried in air. Each side of the treated paper contained approximately 50 mg. of the compound.

The day of the test the dried, chemically treated paper was substituted for one of the untreated papers. All the roaches were dead in one day even though they could stay in an untreated compartment. Apparently all they had to do was to walk over the filter paper containing the 4-nitropyridine-1-oxide. This compound was thus shown to be a very potent contact insecticide.

When pyridine-1-oxide was tested in the manner hereinbefore described using 30 American roaches, all roaches were still alive after a 30-hour period.

Another test was run using the same piece of treated filter paper employed in the first test but this time the roaches were confined on the paper. All were dead in 12 hours.

*Example II*

An ice cream carton provided with a screened top was treated with a 5 weight percent acetone solution of 4-nitropyridine-1-oxide. Flies were placed in the carton. Ninety percent were dead in 4 hours and all were dead in 8 hours.

*Example III*

A Petri dish was treated with a 5 weight percent acetone solution of 4-nitropyridine-1-oxide by pouring the solution into the dish, draining it, and letting it dry. American roaches were confined in the Petri dish for 15 minutes and then transferred to an untreated container. At the end of 24 hours, 66 percent of the roaches had died.

German roaches were confined in the same treated dish. All were dead in 8 hours.

*Example IV*

Thirty-five American roaches of various sizes were placed in an 8-inch crystallizing dish and sprayed with 10 ml. of a one weight percent acetone solution of 4-nitropyridine-1-oxide. They were left in the dish for 15 minutes and then transferred to a clean crystallizing dish. After about 8 hours, nearly all of the roaches appeared paralyzed (were on their backs). Mortality data are shown below:

| Time, Hours | Dead | | Moribund |
|---|---|---|---|
| | Number | Percent | |
| 24 | 30 | 85.7 | 5 |
| 72 | 34 | 97.1 | 1 |

One large adult still had some life after 72 hours but was on its back and moved only feebly.

*Example V*

Two 11 centimeter Whatman No. 40 filter papers were dipped into a solution containing 0.5 gram of 4-nitropyridine in 10 milliliters of acetone, drained, and dried in air. The screen forming the top of a ½-pint ice cream carton was also dipped. The remainder of the solution (about 5 milliliters) was poured into a ½-pint ice cream carton and allowed to flow over the surface. The acetone was allowed to evaporate. The two dipped papers were then put under each of two ground glass containers.

Ten German roaches were introduced into one cylinder. They were extremely irritated and tried to escape. In 15 minutes all were on their backs but were not completely paralyzed. In about 30 minutes, no movement was observed.

Four American roaches were introduced into the second cylinder. They were on their backs in 20 minutes and appeared dead in 30 minutes.

Fifteen houseflies were introduced into the ice cream carton. They were down in 10 minutes. They were removed and covered with a Petri dish. Three or four of them buzzed for about 2 hours and then all were dead.

Another group of 32 flies was put into the same carton. They were all down in ten minutes. They were left in contact with the carton for a total of 30 minutes. At the end of this time all were dead. This test was repeated and the same results were obtained.

The insecticides of this invention are compatible and can be used together with other insecticides such as DDT, Chlordane, etc. Also, they can be used with synergists such as N-alkyl imides of bicyclo[2.2.1]-5-heptene-2,3-dicarboxylic acid and sesoxane [2-(2-ethoxyethoxy)ethyl-3,4 - methylenedioxyphenyl acetal of acetaldehyde] and knock-down agents such as pyrethrum, allethrin and di-n-butyl sulfone, the latter being shown as a knockdown agent or insecticidal agent in Serial Number 632,271, filed Jan. 3, 1957, in which a method of combatting insects with this agent is claimed.

Reasonable variation and modification are possible within the scope of the foregoing disclosure and appended claims to the invention, the essence of which is that the nitropyridines and nitropyridine-1-oxides and their alkyl derivatives, as defined, have been found to be insecticidal in character.

We claim:

1. A method of killing an insect such as a fly, roach, ant, gnat, and mosquito which comprises contacting said insect with an insecticidal amount of an insecticidal compound selected from the group consisting of nitropyridine and nitropyridine-1-oxide substituted on ring carbons with 1 to 2 nitro groups and alkyl groups selected from the group consisting of methyl and ethyl, in which the total carbon atoms in the alkyl groups is not greater than 3.

2. A method according to claim 1 wherein the compound is a nitromethylethylpyridine.

3. A method according to claim 1 wherein the compound is a nitromethylethylpyridine-1-oxide.

4. A method according to claim 1 wherein the compound is 4-nitropyridine.

5. A method according to claim 1 wherein the compound is 4-nitropyridine-1-oxide.

6. A method according to claim 1 wherein the compound is a nitromethylpyridine.

7. A method according to claim 1 wherein the compound is a nitroethylpyridine.

8. A method according to claim 1 wherein the compound is a nitrodimethylpyridine.

9. A method according to claim 1 wherein the compound is a nitrotrimethylpyridine.

References Cited in the file of this patent

UNITED STATES PATENTS

| | | |
|---|---|---|
| 1,778,784 | Rath | Oct. 21, 1930 |
| 2,460,710 | Nolan et al. | Feb. 1, 1949 |

OTHER REFERENCES

Chem. Abst., vol. 50, 1956, pp. 339i and 340a.
Chem Abst., vol. 48, 1954, p. 5276i.
King: Chem. Evaluated as Instecticides and Repellants at Orlanda, Fla., U.S.D.A. Handbook No. 69, p. 298, item No. 9488, May 1954.